(12) United States Patent
Kawaguchi et al.

(10) Patent No.: US 6,484,520 B2
(45) Date of Patent: Nov. 26, 2002

(54) DISPLACEMENT CONTROL APPARATUS FOR VARIABLE DISPLACEMENT COMPRESSOR, DISPLACEMENT CONTROL METHOD AND COMPRESSOR MODULE

(75) Inventors: Masahiro Kawaguchi, Kariya (JP); Masanori Sonobe, Kariya (JP); Ken Suitou, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/794,807

(22) Filed: Feb. 27, 2001

(65) Prior Publication Data

US 2001/0017036 A1 Aug. 30, 2001

(30) Foreign Application Priority Data

Feb. 28, 2000 (JP) ........................................ 2000-051575
Nov. 9, 2000 (JP) ........................................ 2000-342177

(51) Int. Cl.[7] ................................................ B60H 1/32
(52) U.S. Cl. ........................ 62/133; 62/228.3; 62/228.5
(58) Field of Search ................................ 62/133, 228.4, 62/228.5, 228.1, 230, 243, 323.1, 228.3

(56) References Cited

U.S. PATENT DOCUMENTS

| 4,856,291 A | 8/1989 | Takahashi et al. ............ 62/217 |
| 5,199,272 A | * 4/1993 | Yamanka et al. ......... 62/228.4 X |
| 5,257,507 A | 11/1993 | Taguchi ....................... 62/133 |
| 5,385,029 A | 1/1995 | Yamanaka et al. ............. 62/133 |
| 5,531,572 A | 7/1996 | Kimura et al. ............. 417/222.2 |
| 5,893,272 A | 4/1999 | Hanselmann et al. ......... 62/133 |
| 5,924,296 A | 7/1999 | Takano et al. ................ 62/133 |

FOREIGN PATENT DOCUMENTS

| EP | 0 848 164 A2 | 6/1998 |
| JP | 5-096938 | 4/1993 |
| JP | 10-278567 | 10/1998 |
| WO | WO 98/17928 | 4/1998 |

* cited by examiner

Primary Examiner—Harry B. Tanner
(74) Attorney, Agent, or Firm—Morgan & Finnegan, LLP

(57) ABSTRACT

A displacement control apparatus controls the displacement of a variable displacement controller. A drive shaft of the compressor is driven by an engine. Torque acting on the drive shaft represents the displacement. The apparatus includes a control valve, an air conditioner controller and a compressor controller. The control valve changes the compressor displacement. The air conditioner controller produces a torque setting signal, which represents a target torque, to the compressor controller. The compressor controller changes the valve opening based on the torque setting signal such that the actual load torque matches the target torque value. Accordingly, the compressor is controlled according to the torque. The air conditioner controller may send the torque setting signal to an engine controller, which eliminates the need for load torque maps.

19 Claims, 5 Drawing Sheets

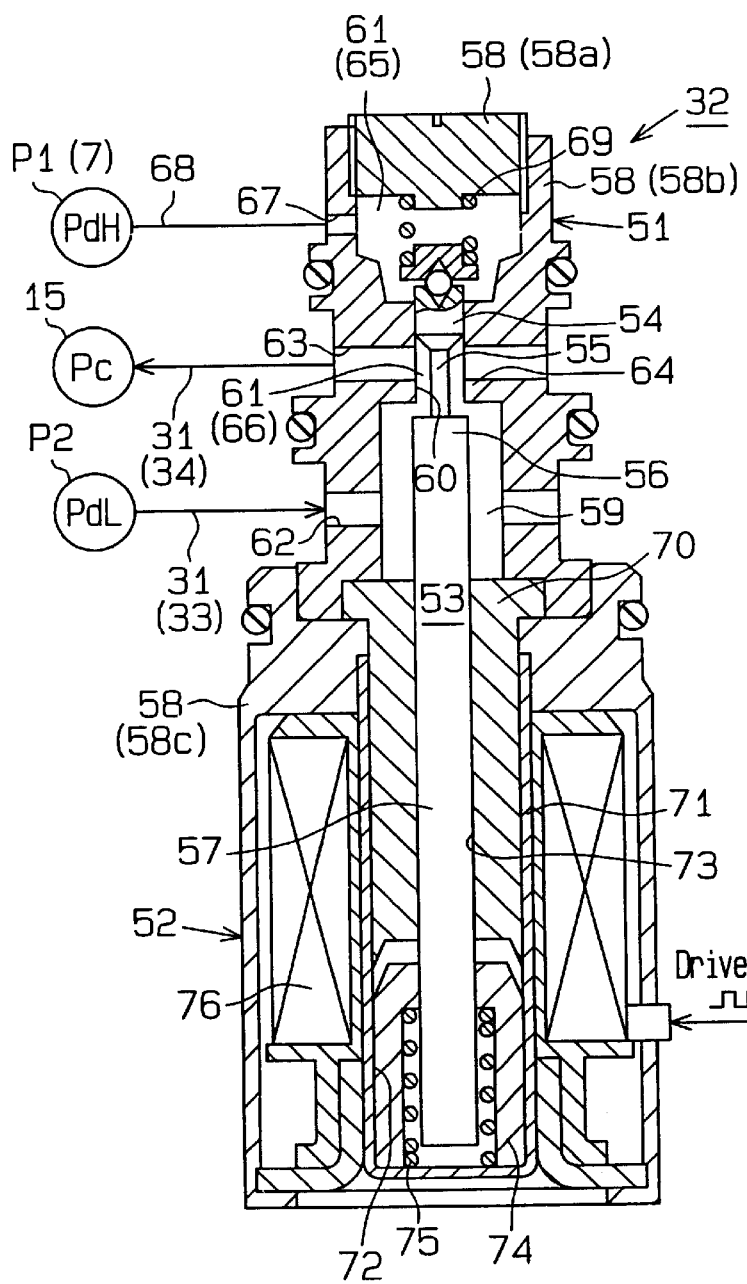
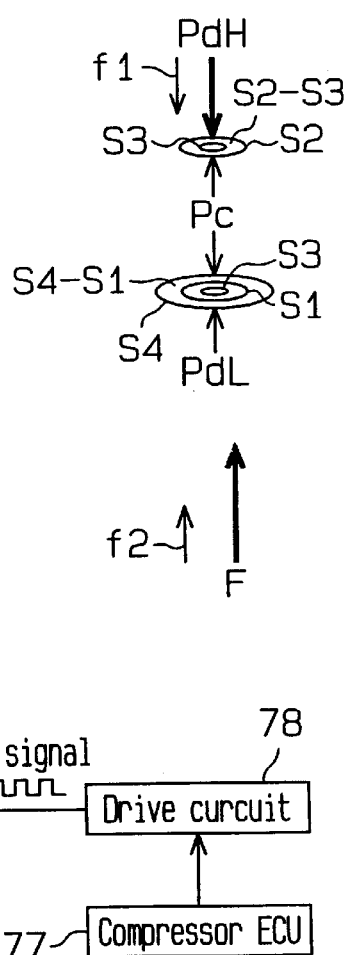
Fig.3(a)
Fig.3(b)

DISPLACEMENT CONTROL APPARATUS FOR VARIABLE DISPLACEMENT COMPRESSOR, DISPLACEMENT CONTROL METHOD AND COMPRESSOR MODULE

BACKGROUND OF THE INVENTION

The present invention relates to a displacement control apparatus for a variable displacement compressor, a displacement control method and a compressor module.

A typical refrigerant circuit of a vehicle air conditioner includes a condenser, an expansion valve, an evaporator and a compressor.

Variable displacement swash plate type compressors are widely used in vehicle air conditioners. Such compressors include a displacement control mechanism, which operates to maintain the exit pressure of an evaporator or the suction pressure Ps of a compressor associated with the exit pressure at a predetermined target value (set pressure). The exit pressure of an evaporator or the suction pressure Ps of a compressor associated with the exit pressure reflects the magnitude of the cooling load. The variable control mechanism controls the exit pressure of the evaporator or the suction pressure Ps to adjust the inclination angle of the swash plate of the compressor, which adjusts the displacement of the compressor.

The variable control mechanism includes an internal control valve and an external control valve. The internal control valve has a pressure sensing member such as a bellows or a diaphragm. The valve opening degree is adjusted by sensing the exit pressure of the evaporator or the suction pressure Ps of the compressor with the pressure sensing member so that the valve body is positioned accordingly. The pressure in a crank chamber, which accommodates the swash plate, is adjusted by the valve opening degree. The inclination angle of the swash plate is determined by the pressure in the crank chamber. A simple internal control valve has only a single set pressure, and such a simple control valve cannot perform complex control for power consumption.

Such compressors are usually driven by vehicle engines. Among the auxiliary devices of a vehicle, the compressor consumes the most engine power. Accordingly, under exceptional conditions, for example, when the vehicle is accelerating or moving uphill, all available engine power needs to be used for moving the vehicle. To reduce the engine load, the compressor displacement must be minimized.

Japanese Unexamined Patent Publication No. Hei 10-278567 discloses an external control valve in which the valve opening degree can be controlled by external electric signals. A variable displacement compressor having the external control valve is able to minimize the discharge displacement of the compressor by changing the opening degree of the external control valve.

The power that the compressor actually consumes, or the load torque Tr of the compressor, varies greatly in accordance with changes in the suction pressure Ps and the discharge pressure Pd of the compressor. To prevent the engine from stalling even if the required load torque Tr of the compressor is increased, it is necessary for the compressor to be driven at high speed (over a predetermined value) at all times. However, this increases the power that the compressor consumes.

To reduce the power that the compressor consumes, a controller that controls the engine estimates the load torque Tr. The engine output torque $Tr_{eng}$, which is the total torque of an engine, is a value obtained by adding the required load torque Tr of the compressor to the torque necessary for vehicle travel. When all available engine power needs to be used for moving the vehicle, the engine controller is able to give priority to moving the vehicle using this torque data.

The load torque Tr of the compressor has been estimated by the use of an experimentally created map. However, since the load torque Tr of a compressor is different depending on the refrigerant circuit to which the compressor is connected, a map is needed for each air-conditioner, that is, for every type vehicle. This complicates the preparation of maps. Further, estimation of the load torque of the compressor from the map is always required to improve efficiency. This is also complicated.

Further, in an auto air-conditioner, the compressor is controlled by an air controller. In this case, the displacement of the compressor is controlled based on external information such as the temperature in the vehicle passenger compartment, and is not controlled based on torque.

SUMMARY OF THE INVENTION

Accordingly, it is an object of the present invention to provide a displacement control apparatus, a displacement control method and a compressor module that accurately controls the compressor displacement based on torque. Another object of the present invention is to provide a displacement control apparatus and a displacement control method in which load torque data of a compressor for controlling the displacement of the compressor can also be used for controlling an engine and it is not necessary to estimate the load torque of the compressor for every type vehicle.

To achieve the object, a displacement control apparatus for controlling the discharge displacement of a variable displacement compressor has a control valve, a first controller, and a second controller. The compressor is incorporated in a refrigerant circuit of a vehicle air conditioner and includes a drive shaft. A load torque is imposed on the drive shaft by driving the drive shaft with an external drive source. A change in the load torque reflects the control of the discharge displacement.

The control valve changes the displacement of the compressor by changing the valve opening degree. The first controller, which is provided outside the compressor, sends a torque setting signal. The torque setting signal indicates a set torque for controlling the discharge displacement of the compressor. The second controller receives the torque setting signal sent from the first controller. The second controller computes an index for changing the opening degree of the control valve based on the torque setting signal so that the load torque of the compressor is changed to the set torque. As a result, the control valve opening degree is controlled to change the displacement of the compressor.

A displacement control method for controlling the discharge displacement of a variable displacement compressor is also provided. The compressor is incorporated in a refrigerant circuit of a vehicle air conditioner and includes a drive shaft. A load torque is imposed on the drive shaft by driving the drive shaft with an external drive source. A change in the load torque reflects the control of the discharge displacement.

The method comprises determining a set torque for controlling the displacement of the compressor outside the compressor, transmitting a torque setting signal indicating the set torque to the compressor, and changing the load torque to the set torque by controlling the discharge displacement of the compressor.

A compressor module comprises a compressor, a control valve in the compressor, and a compressor controller mounted on the compressor.

The compressor forms part of a refrigerant circuit in a vehicle air conditioner. The compressor includes a drive shaft on which a load torque is imposed by an external drive source. The control valve changes the discharge displacement of the compressor by controlling the valve opening degree. The compressor controller receives a torque setting signal indicating a set torque from outside the compressor. The compressor controller computes an index for changing the control valve opening degree based on the torque setting signal so that the load torque is changed to the set torque. The compressor controller sends an instruction to the control valve according to the index. As a result, the control valve opening degree is controlled to control the displacement of the compressor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3(a) is a cross-sectional view of a control valve of the first embodiment;

FIG. 3(b) is a schematic view for explaining forces which act on an operating rod;

DETAILED DESCRIPTION OF THE PREFERRED EMBODIMENTS

Figure 1:
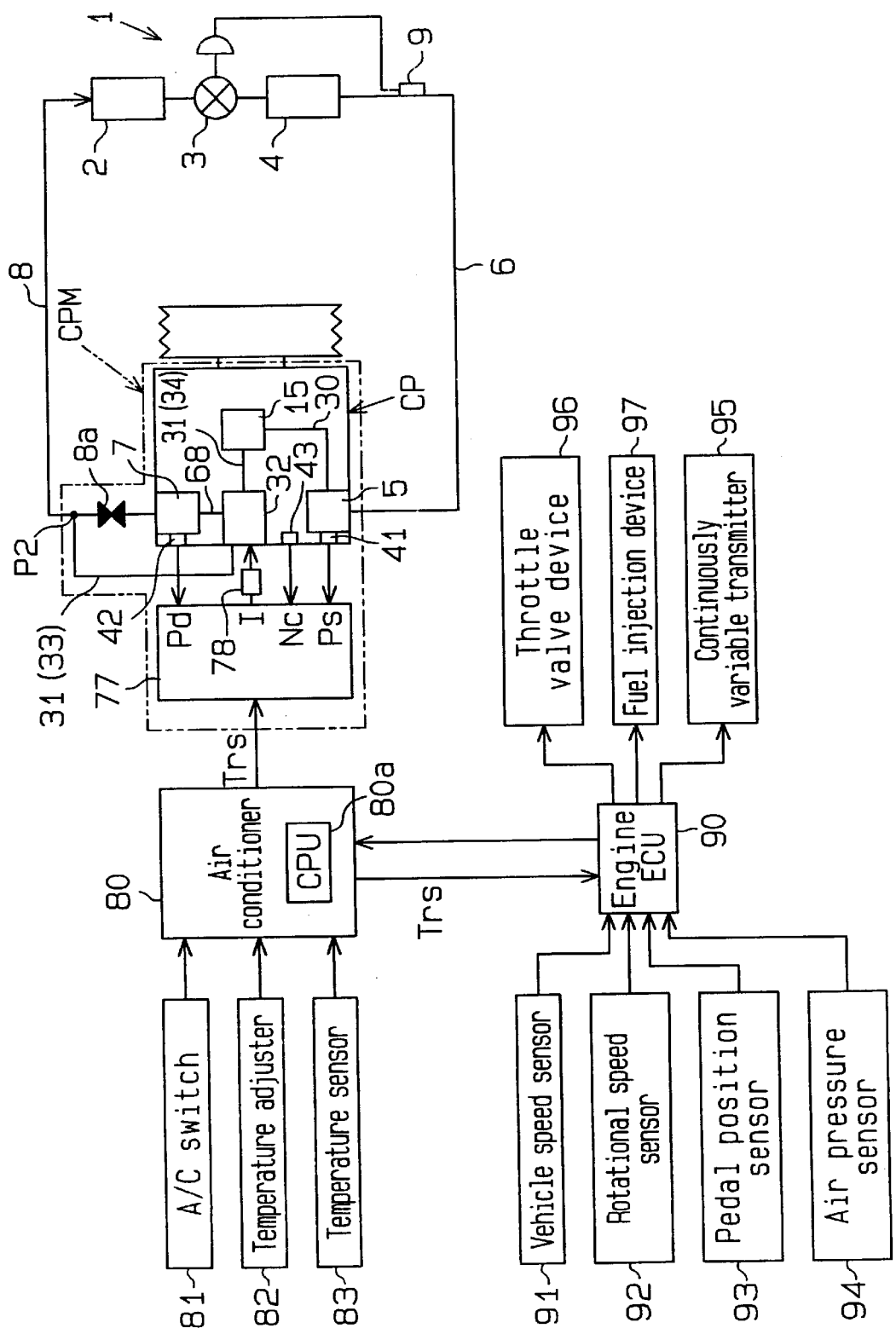
FIG. 1 is a circuit diagram of a vehicle air conditioner in which a displacement control apparatus according to the present invention is incorporated.

First and second embodiments of the present invention will be described with reference to FIGS. 1 to 5(b). In the second embodiment the same or corresponding members are denoted by the same reference numerals, and only the differences from the first embodiment will be described.

(First Embodiment)

As shown in FIG. 1, a refrigerant circuit of a vehicle air conditioner includes a compressor module CPM, which includes a variable displacement compressor CP and a compressor controller 77 connected the compressor CP, and an external refrigerant circuit 1. The external refrigerant circuit 1 includes a condenser 2, an expansion valve 3, an evaporator 4, a low pressure pipe 6 for refrigerant gas, which connects the exit of the evaporator 4 to a suction chamber 5 of the compressor CP, and a high pressure pipe 8, which connects a discharge chamber 7 of the compressor CP to the condenser 2. In the middle of the high pressure pipe 8, a fixed restrictor 8a is provided. The fixed restrictor 8a is located between two points at which the pressure is measured and increases the pressure difference.

The refrigerant gas enters the suction chamber 5 from the evaporator 4 via the low pressure pipe 6. The compressor CP draws and compresses the refrigerant gas from the suction chamber 5 and discharges the compressed refrigerant gas to the discharge chamber 7. High pressure refrigerant gas in the discharge chamber 7 is supplied to the condenser 2 via the high pressure pipe 8. The opening size of the expansion valve 3 is automatically feedback controlled based on the temperature and pressure of the refrigerant. A temperature sensing cylinder 9 provided downstream of the evaporator 4 detects the temperature of the refrigerant. Thus, the expansion valve 3 adjusts the flow rate of refrigerant supplied to the evaporator 4 and also directly adjusts the flow rate of refrigerant in the external refrigerant circuit 1.

Figure 2:
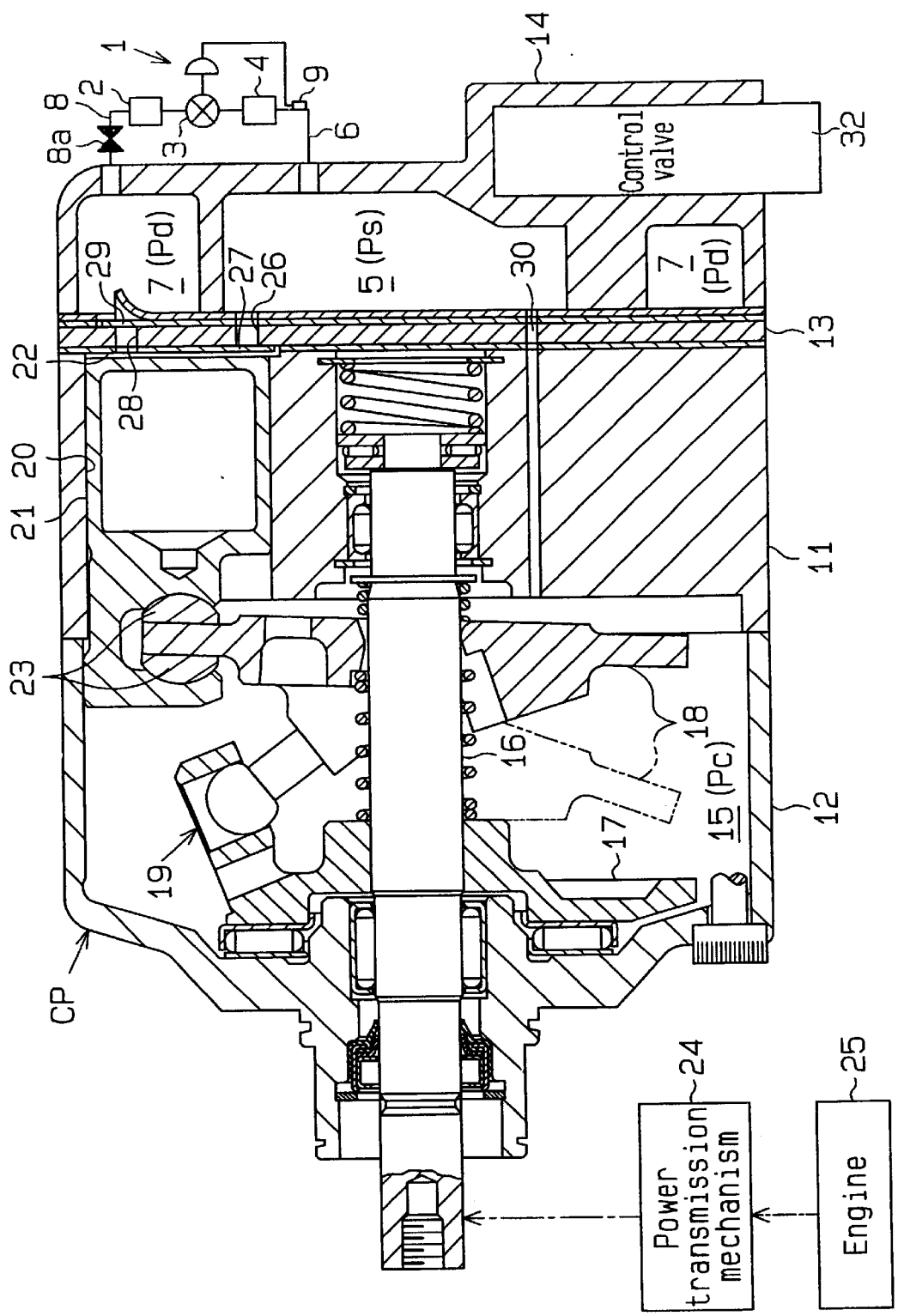
FIG. 2 is a cross-sectional view of a variable displacement compressor.

As shown in FIG. 2, the compressor CP includes a cylinder block 11, a front housing 12, which is secured to the front end face of the cylinder block 11, and a rear housing 14, which is connected to the rear end face of the cylinder block 11 via a valve plate assembly 13.

A crank chamber 15 is defined between the cylinder block 11 and the front housing 12. A drive shaft 16 extends through the crank chamber 15 and is rotatably supported by the cylinder block 11 and the front housing 12 through a bearing. A lug plate 17 is located in the crank chamber 15 and is secured to the drive shaft 16.

A swash plate 18, which is used as a cam plate in this embodiment, is accommodated in the crank chamber 15. The swash plate 18 is supported to slide along the axial direction of the drive shaft 16 and to incline with respect to a plane perpendicular to the drive shaft 16. A hinge mechanism 19 connects the lug plate 17 to the swash plate 18. The hinge mechanism 19 permits the swash plate 18 to rotate integrally with the lug plate 17 and the drive shaft 16, guides the movement of the swash plate 18 in the axial direction of the drive shaft 16, and guides the inclination of the swash plate 18 with respect the drive shaft 16.

A plurality of cylinder bores 20 (only one shown) are formed around the axis of the drive shaft 16 in the cylinder block 11. A single headed piston 21 is accommodated in each cylinder bore 20. The front and rear openings of the cylinder bore 20 are closed by the valve plate assembly 13 and the piston 21, respectively. Each piston 21 defines a gas compression chamber in the corresponding cylinder bore 20. Each piston 21 is coupled to the swash plate 18 by a pair of shoes 23. The swash plate 18 converts rotation of the drive shaft 16 into reciprocation of each piston 21 via the shoes 23. The lug plate 17, the swash plate 18, the hinge mechanism 19 and the shoe 23 function as a variable displacement mechanism.

The drive shaft 16 is coupled to an engine, which serves as an external drive source, via a power transmission mechanism 24. The power transmission mechanism 24 includes a belt and a pulley. The power transmission mechanism 24 may include a clutch mechanism, such as an electromagnetic clutch, which is capable of engaging or disengaging the compressor by external electric control. In this embodiment, the power transmission mechanism 24 has no clutch mechanism. Therefore, while the engine 25 is running, the compressor is driven continuously.

A suction chamber 5 and a discharge chamber 7 are defined between the valve plate assembly 13 and the rear housing 14. The suction chamber 5 forms a suction pressure zone, the pressure of which is a suction pressure Ps. The discharge chamber 7 forms a discharge pressure zone, the pressure of which is a discharge pressure Pd. The valve plate assembly 13 has suction ports 26 and suction valves 27, which open and close the ports 26, discharge ports 28 and discharge valves 29, which open and close the ports 28 corresponding to each cylinder bore, respectively.

The inclination angle of the swash plate 18 changes according to the pressure in the crank chamber 15 (crank pressure Pc). The inclination angle of the swash plate 18 determines the stroke of piston 21 or the displacement of the compressor.

As shown in FIG. 1, the compressor CP includes a crank pressure control mechanism for controlling the crank pressure Pc. The crank pressure control mechanism includes a bleed passage 30, a supply passage 31 and a control valve 32. The bleed passage 30 connects the crank chamber 15 to the suction chamber 5 to release refrigerant gas from the crank chamber 15. The supply passage 31 connects a second pressure monitoring point P2 in the high pressure pipe 8, which is closer to the condenser 2 than the fixed restrictor 8a, to the crank chamber 15 to conduct the refrigerant gas to the crank chamber 15. The supply passage 31 includes a pressure detecting passage 33, which connects the second pressure monitoring point P2 to the control valve 32, and a crank passage 34, which connects the control valve 32 to the crank chamber 15. The pressure detecting passage 33 forms an upstream section of the supply passage 31, and the crank passage 34 forms a downstream section of the supply passage 31. The control valve 32 adjusts the flow rate of the high pressure refrigerant gas supplied to the crank chamber 15 through the supply passage 31 to control the crank pressure Pc.

FIG. 3(a) shows a cross-sectional view of a control valve of the first embodiment of the present invention. The control valve 32 includes an inlet valve mechanism 51 and a solenoid 52, which is used as an electromagnetic actuator. The inlet valve mechanism 51 adjusts the opening degree of the supply passage 31. The solenoid 52 exerts a force according to the level of an electric current, which is applied to the inlet valve mechanism 51, through an operating rod 53. The operating rod 53 is cylindrical and has a divider 54, a coupler 55 and a guide 57. The end of the guide 57 that is adjacent to the coupler 55 functions as a valve body 56. The cross-sectional area of the coupler 55 is smaller than the cross-sectional area S4 of the valve body 56.

The valve housing 58 of the control valve 32 includes a plug 58a, an upper housing member 58b, which houses the inlet valve mechanism 51, and a lower housing member 58c, which houses the solenoid 52. The plug 58a is threaded into the upper housing member 58b to close an upper opening. A valve chamber 59 and a through hole 60 connected thereto are defined in the upper housing member 58b. A pressure sensing chamber 61 is defined by the upper housing member 58b and the plug 58a. The pressure sensing chamber 61 includes a high pressure chamber 65 and a crank pressure chamber 66. The through hole 60 connects the pressure sensing chamber 61 to the valve chamber 59. The operating rod 53 extends through the valve chamber 59 and the through hole 60 to the pressure sensing chamber 61. The operating rod 53 moves axially such that the valve body 56 selectively connects the valve chamber 59 and the through hole 60. The crank pressure chamber 66 is always connected to the through hole 60.

A first radial port 62 is formed in the upper housing member 58b to communicate with the valve chamber 59. The valve chamber 59 is connected to the second pressure monitoring point P2 through the first radial port 62 and the pressure detecting passage 33. Thus, the pressure PdL at the second pressure monitoring point P2 is applied to the valve chamber 59 through the pressure detecting passage 33 and the first port 62. A second radial port 63 is formed in the upper housing member 58b to communicate with the crank pressure chamber 66. The second radial port 63 connects the crank pressure chamber 66 to the crank chamber 15 through the crank passage 34. The first radial port 62, the valve chamber 59, the through hole 60, the crank pressure chamber 66 and the second radial port 63 form a part of the supply passage 31 within the control valve 32.

The valve body 56 of the operating rod 53 is located in the valve chamber 59. The cross-sectional area S3 of the coupler 55 extending within the through hole 60 is smaller than the cross-sectional area S1 of the through hole 60. The cross-sectional area S1 of the through hole 60 is smaller than the cross-sectional area S4 of the valve body 56. Accordingly, the inner wall of the valve chamber 59, to which the through hole 60 opens, functions as a valve seat 64 for receiving the valve body 56. The through hole 60 functions as a valve opening, which is selectively opened and closed by the valve body 56. When the valve body 56 contacts the valve seat 64, the through hole 60 is shut off from the valve chamber 59. As shown in FIG. 3, when the valve body 56 is spaced from the valve seat 64, the through hole 60 is connected to the valve chamber 59.

The divider 54 of the operating rod 53 is fitted in the pressure sensing chamber 61. The divider 54 divides the pressure sensing chamber 61 into the high pressure chamber 65 and the crank pressure chamber 66. The divider 54 functions as a partition between the high pressure chamber 65 and the crank pressure chamber 66 and does not permit direct connection between both chambers 65 and 66. The cross-sectional area S2 of the divider 54, which functions as the partition, is equal to cross-sectional area S1 of the through hole 60. Therefore, the passage within the pressure sensing chamber 61, through which the divider 54 is fitted, is continuous with the through hole 60.

A third radial port 67 is defined in the upper housing member 58b to communicate with the high pressure chamber 65. The high pressure chamber 65 is connected through the third port 67 and the passage 68 to the first pressure monitoring point P1, or the discharge chamber 7. Thus, the pressure PdH at the first pressure monitoring point P1 is applied through the passage 68 and the third port 67 to the high pressure chamber 65.

A return spring 69 is contained in the high pressure chamber 65. The return spring 69 urges the operating rod 53 to cause the valve body 56 to move away from the valve seat 64.

The solenoid 52 is provided with a cup-shaped receiving cylinder 71 fixed in the lower housing member 58c. A fixed iron core 70 is fitted in the upper opening of the receiving cylinder 71. The fixed iron core 70 is a part of the inner wall of the valve chamber 59 and also defines a plunger chamber 72 in the receiving cylinder 71. A movable iron core 74 is contained in the plunger chamber 72. The fixed iron core 70 includes a guide hole 73, which accommodates the guide 57. A slight clearance (not shown) exists between the inner wall of the guide hole 73 and the guide 57. The valve chamber 59 and the plunger chamber 72 communicate with each other through the clearance. Thus, the pressure in the valve chamber 59, or the pressure PdL at the second pressure monitoring point P2, is applied inside the plunger chamber 72.

The lower end of the guide 57 extends into the plunger chamber 72. The movable iron core 74 is fixed to the lower end of the guide 57. The movable iron core 74 moves in the axial direction integrally with the operating rod 53.

A shock absorbing spring 75 is contained in the plunger chamber 72. The shock absorbing spring 75 urges the movable iron core 74 and the operating rod 53 toward the fixed iron core 70. The force of the shock absorbing spring 75 is less than the force of the return spring 69. Accordingly, when electric power is not supplied to a coil 76, the return spring 69 moves the movable iron core 74 and the operating rod 53 to the initial position as shown in FIG. 3(a), so that the control valve 32 is fully open.

The coil 76 surrounds the fixed iron core 70 and the movable iron core 74. A compressor controller 77 supplies electric power to the coil 76 through a drive circuit 78. The coil 76 then generates an electromagnetic force F corresponding to the level of the electric power supplied to the coil 76 between the fixed iron core 70 and the movable iron core 74. The electromagnetic force F attracts the movable iron core 74 toward the fixed iron core 70 and urges the valve body 56 towards the valve seat 64.

There are various methods for changing the voltage applied to the coil 76, one of which is to change the voltage value itself and another is referred to as duty control. Duty control is employed in this embodiment. Duty control is a method where the ON-time per cycle of a pulsed voltage, which is turned on and off periodically, is adjusted to modify the average value of the applied voltage. The average value of the applied voltage can be obtained by multiplying the ratio of the ON-time of the pulsed voltage to the cycle time thereof, i.e., the duty ratio Dt, by the pulsed voltage value. The smaller the duty ratio Dt is, the smaller the electromagnetic force F generated between the fixed iron core 70 and the movable iron core 74 is and the greater the opening degree of the valve is. In contrast, the larger the duty ratio Dt is, the smaller the opening degree of the valve is.

The opening degree of the control valve 32 depends on the axial position of the operating rod 53. The axial position of the operating rod 53 is determined based on various forces that act axially on the operating rod 53. These forces will be described referring to FIG. 3(b). The downward forces shown in FIG. 3(b) tend to space the valve body 56 from the valve seat 64 (the valve opening direction). The upward forces shown in FIG. 3(b) tend to move the valve body 56 toward the valve seat 64 (the valve closing direction).

First, the various forces acting on the portion of the operating rod 53 above the coupler 55, i.e., on the divider 54, will be described. The divider 54 receives a downward force f1 from the return spring 69. The divider 54 also receives a downward force based on the pressure PdH in the high pressure chamber 65. The effective pressure receiving area of the divider 54 with respect to the pressure PdH of the high pressure chamber 65 is equal to the cross-sectional area S2 of the divider 54. The divider 54 also receives an upward force based on the pressure in the through hole 60 (crank pressure Pc). The effective pressure receiving area of the divider 54 with respect to the pressure Pc in the through hole is equal to the cross-sectional area S2 of the divider 54 minus the cross-sectional area S3 of the coupler 55. Provided that the downward forces are positive values, the net force $\Sigma F1$ acting on the divider 54 can be expressed by the following equation 1.

$$\Sigma F1 = PdH \cdot S2 - Pc(S2-S3) + f1 \qquad \text{Equation 1}$$

Next, various forces that act on the portion of the operating rod 53 below the coupler 55, i.e., on the guide 57, will be described. The guide 57 receives an upward force f2 from the shock absorbing spring 75 and an upward electromagnetic force F from the solenoid 52. The guide 57 also receives an upward force based on the pressure PdL in the plunger chamber 72. The effective pressure receiving area of the guide 57 with respect to the pressure PdL in the plunger chamber 72 is equal to the cross-sectional area S4 of the guide 57. The guide 57 also receives a downward force based on the pressure PdL in the valve chamber 59 and a downward force based on the pressure Pc in the through hole 60. The effective pressure receiving area of the guide 57 with respect to the pressure PdL in the valve chamber 59 is equal to the cross-sectional area S4 of the guide 57 minus the cross-sectional area S1 of the through hole 60. The effective pressure receiving area of the guide 57 with respect to the pressure Pc in the through hole 60 is equal to the cross-sectional area S1 of the through hole 60 minus the cross-sectional area S3 of the coupler 55. Provided that the upward forces are positive values, the net force $\Sigma F2$ acting on the guide 57 can be expressed by equation 2.

$$\Sigma F2 = F + f2 - Pc(S1-S3) - PdL(S4-S1) + PdL \cdot S4 = F + f2 + PdL \cdot S1 - Pc(S1-S3) \qquad \text{Equation 2}$$

The operating rod 53 is integral with the divider 54, the coupler 55 and the guide 57. Thus, the axial position of the operating rod 53 is a position where the force $\Sigma F1$ in equation 1 is balanced with the force $\Sigma F2$ in equation 2. When $\Sigma F1 = \Sigma F2$, the following equation 3 is obtained.

$$PdH \cdot S2 - PdL \cdot S1 - Pc(S2-S1) = F - f1 + f2 \qquad \text{Equation 3}$$

The cross-sectional area S1 of the through hole 60 is equal to the cross-sectional area S2 of the divider 54. Therefore, if S2 is replaced with S1 in equation 3, the following equation 4 is obtained.

$$PdH - PdL = (F - f1 + f2)/S1 \qquad \text{Equation 4}$$

In equation 4, the (PdH−PdL) on the left side 4 is the pressure difference $\Delta Pd$ between the two points, that is, the first pressure monitoring point P1 and the second pressure monitoring point P2. Also, in equation 4, f1, f2 and S1 are fixed parameters, which are determined by the design of the device. The electromagnetic force F is, however, a variable parameter that changes depending on the power supplied to the coil 76. Equation 4 shows that the operating rod 53 operates to change the pressure difference $\Delta Pd$ in accordance with changes in the electromagnetic force F. In other words, the operating rod 53 operates in accordance with the pressure PdH and the pressure PdL, which act on the rod 53, such that the pressure difference $\Delta Pd$, which is determined by the electromagnetic force F, seeks target, or set pressure difference $\Delta Pd_{set}$. The operating rod 53 functions as a pressure detecting body together with the valve chamber 59, the plunger chamber 72 and the high pressure chamber 65 and the like. The pressure difference $\Delta Pd$ is expressed the following equation 5 which is a function of the input current for the coil 76.

$$\Delta Pd = f(I). \qquad \text{Equation 5}$$

In the first embodiment of the present invention, the position of the operating rod 53, which changes the displacement of the compressor, is determined by the pressure difference $\Delta Pd$.

Referring to FIG. 1 again, the compressor module CPM includes a suction pressure sensor 41, a discharge pressure sensor 42 and a rotation sensor 43, which function as an information detector. The suction pressure sensor 41 detects the suction pressure Ps of the compressor CP, the discharge pressure sensor 42 detects the discharge pressure Pd of the compressor CP and the rotation sensor 43 detects the rotational speed Nc (rpm) of the drive shaft 16. The suction pressure Ps and discharge pressure Pd of the compressor CP and rotational speed Nc of the drive shaft 16 are sent to a compressor controller 77.

In the compressor controller 77, the load torque Tr of the compressor CP, which acts on the drive shaft 16, is calculated by using the discharge pressure Pd, the rotational speed Nc, and the discharge gas flow rate Qd as variables.

$$Tr = 60/(2\pi \cdot NC) \cdot [n/(n-1) \cdot Pd \cdot Qd \cdot \{1-(Pd/Ps)^{(1-n)/n}\}] + T_{loss} \quad \text{Equation 6}$$

In equation 6, Tloss is loss torque, n is specific heat ratio (for example, for R134a, n=1.03) and Ps is the suction pressure Ps of the compressor CP.

In equation 6, the discharge pressure Pd, the rotational speed Nc and the discharge gas flow rate Qd are variables that greatly influence the load torque Tr. In the present embodiment, to express the load torque Tr more accurately, even the suction pressure Ps which has a small effect on the load torque Tr compared with the other variables, is used as a variable.

The discharge gas flow rate Qd of the compressor, which is the refrigerant discharge amount per unit time from the compressor CP to the external refrigerant circuit, is calculated by equation 7, which follows $$Qd = (\text{flow rate coefficient}) \cdot (\text{restrictor area}) \cdot \sqrt{(2\Delta Pd/\rho d)} \quad \text{Equation 7}$$

wherein the pressure difference ΔPd can be calculated by the use of the input current I to the coil 76 of the control valve 32 as shown in equation 5. The pressure difference ΔPd depends on the characteristics of the valve. The specific weight ρd of the discharge gas can be approximated using the discharge pressure Pd detected by the discharge pressure sensor 42.

In the present embodiment, a fixed restrictor 8a is provided near the compressor CP. Therefore, the pressure difference ΔPd, the restrictor area and the specific weight ρd of the discharge gas can be used to accurately approximate the discharge gas flow rate Qd.

The compressor controller 77 is an electronic control unit for the compressor including a CPU, a ROM, a RAM and an input-output interface. The compressor controller 77 stores equation 6. An external controller (for example, an air conditioner controller 80) sends torque setting signals to the compressor controller 77. The compressor controller 77 computes the set pressure difference $\Delta Pd_{set}$ of the control valve 32, which reflects the discharge gas flow rate Qd corresponding to the set torque $Tr_{set}$ based on equations 6 and 7 to cause the load torque Tr that acts on the drive shaft 16 and the set torque $Tr_{set}$ to coincide based on the torque setting signals. Further, the compressor controller 77 computes the duty ratio Dt necessary for drive signals sent to the coil 76 to adjust the control valve 32 to produce the set pressure difference $\Delta Pd_{set}$. The compressor controller 77 commands the drive circuit 78, and the drive circuit 78 sends drive signals to the coil 76 at the duty ratio Dt. Thus, the voltage applied to the coil 76 is changed as required, and the control valve 32 is controlled to produce set pressure difference $\Delta Pd_{set}$. In this specification, the external controller produces torque setting signals for the set torque $T_{set}$ to a controller that computes an index. The index controls the control valve from the torque setting signals. The external controller is located outside the compressor.

The air conditioner controller 80 of the vehicle air conditioner shown in FIG. 1 is an electronic control unit including a CPU 80a, a ROM, a RAM and an input-output interface (I/O). The input terminal of I/O of the air conditioner controller 80 is connected to a first device for detecting external information that reflects the refrigerant performance required for the refrigerant circuit of an air conditioner. The first device includes an air conditioner switch 81, which turns the air conditioner on and off, a temperature adjuster 82, which sets a target temperature in the passenger compartment of the vehicle, and a passenger compartment temperature sensor 83, which detects the temperature in the passenger compartment. The temperature adjuster 82 and the temperature sensor 83 are operated by a passenger in the vehicle. The air conditioner controller 80 computes an appropriate discharge refrigerant discharge amount for the compressor based on the ON/Off state of the air conditioner switch 81, the target temperature in the temperature adjuster 82 and the temperature in the passenger compartment temperature sensor 83 and computes the corresponding load torque Tr of the compressor CP from equation 6.

The air conditioner controller 80 controls the corresponding drive section (not shown) to maintain a desired temperature in the passenger compartment at a target temperature set by the temperature adjuster 82. Then, the drive section adjusts the temperature of air exiting from the air conditioner, air flow, air flow patterns and the like. The drive section includes a servo motor, a blower motor, and an air mix door driving servo motor, which drive a door through which internal and external air are exchanged.

An engine controller 90 is an electronic control unit for an engine, including a CPU, a ROM, a RAM and an input-output interface (I/O). The input terminal of I/O of the engine controller 90 is connected to a second device for detecting external information that reflects the load on the engine. The second device includes a vehicle speed sensor 91, a rotational speed sensor 92 for detecting the rotational speed Ne of the engine 25, a pedal position sensor 93 for detecting the depression degree of an acceleration pedal (gas pedal) of the vehicle and an air pressure sensor 94 for detecting the pressure of air being drawn into the engine. To the output terminal of I/O of the engine controller 90 are connected a continuously variable transmission 95, an electronic control throttle device 96 provided in the intake passage of the engine 25, and a fuel injection device 97.

The engine controller 90 communicates with the air conditioner controller 80 and receives and sends data signals from and to the air conditioner controller 80. The engine controller 90 sends information regarding whether or not the vehicle is in an exceptional control mode, to the air conditioner controller 80. In this specification, the "exceptional control mode" indicates the following modes: a case where the engine 25 is under a high load such as when climbing, a case where the vehicle is being accelerated, such as when overtaking another vehicle, and a case where the engine 25 is being started. When the air conditioner controller 80 receives the information that a vehicle is in an exceptional mode from the engine controller 90, it sets the lowest torque value as a set torque $Tr_{set}$, and at other times (non-exceptional mode) the air conditioner controller 80 sets the load torque according to the appropriate discharge gas flow rate Qd as the set torque $Tr_{set}$. The selective determination of the set torque $Tr_{set}$ in the air conditioner controller 80 will be described.

Figure 4:
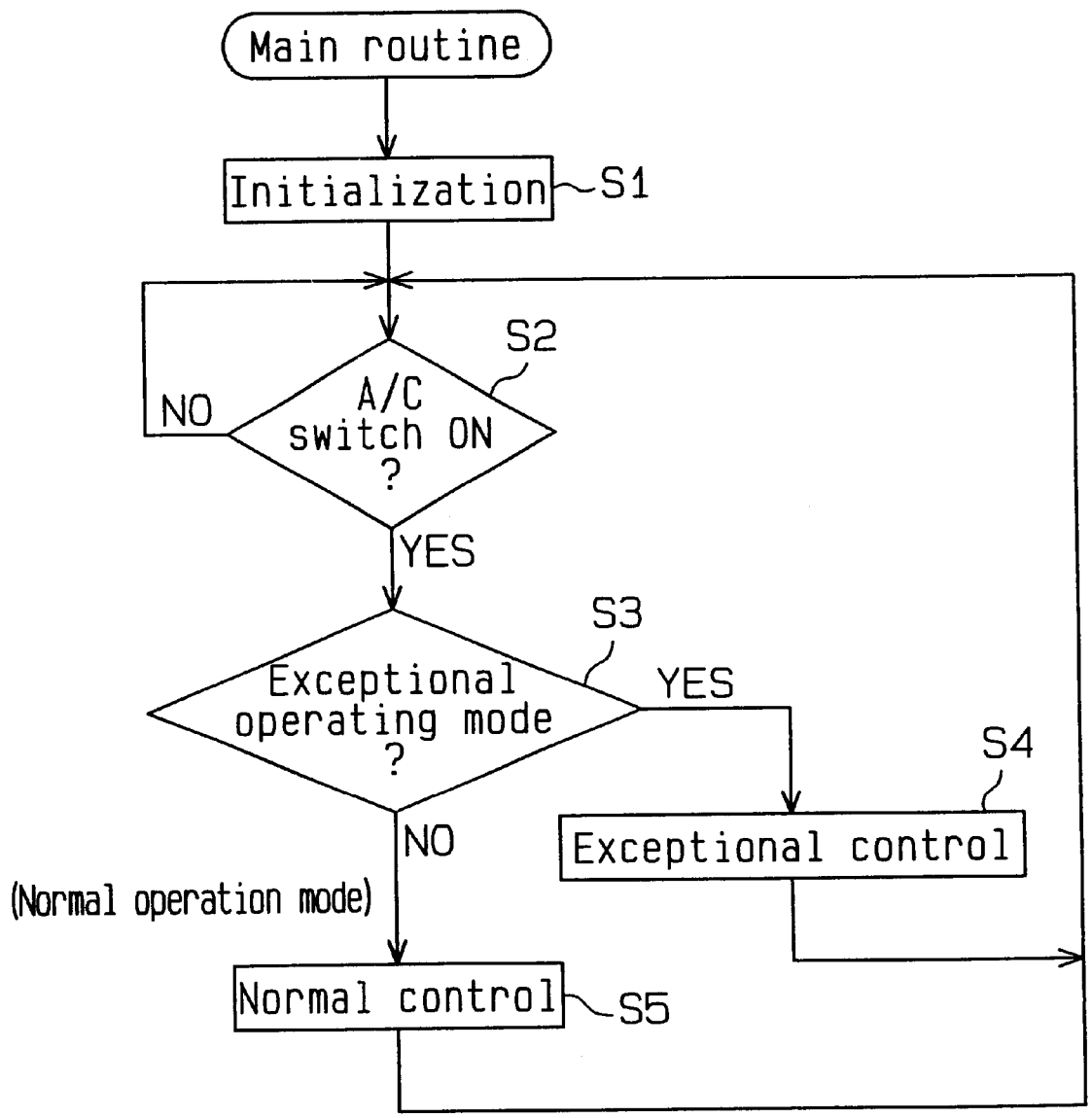
FIG. 4 is a flowchart showing the main routine for the displacement control of the compressor.

The flowchart of FIG. 4 shows the main routine for controlling the compressor CP displacement. When the ignition switch or the starting switch is turned on, the air conditioner controller 80 starts processing. The air conditioner controller 80 performs various initial settings in step S1.

In step S2, the air conditioner controller 80 waits until the air conditioner switch 81 is turned on. When the air conditioner switch 81 is turned on, the air conditioner controller 80 proceeds to step S3.

In step S3, the air conditioner controller 80 determines whether or not the vehicle is in an exceptional mode from the signals from the engine controller 90. If the outcome of step S3 is positive, the air conditioner controller 80 proceeds to step S4 and performs an exceptional control procedure corresponding to the exceptional mode. In the exceptional control procedure, the air conditioner controller 80 instructs the compressor controller 77 to set the lowest torque value as the set torque $Tr_{set}$.

If the outcome of step S3 is negative, the air conditioner controller 80 proceeds to step S5 and performs a normal control procedure. In the normal control procedure, the air conditioner controller 80 computes the refrigerant discharge amount required for the compressor CP based on information such as the set temperature by the temperature adjuster 82 and the detected temperature from the passenger compartment temperature sensor 83 and the like, and the controller 80 computes the corresponding compressor CP torque Tr. Then, the air conditioner controller 80 instructs the compressor controller 77 to set the computed torque Tr as the set torque $Tr_{set}$. Further, the air conditioner controller 80 sends the set torque $Tr_{set}$ to the engine controller 90.

As described above, the compressor controller 77 subsequently computes the discharge flow rate Qd corresponding to the torque setting signals instructed from the air conditioner controller 80, computes the pressure difference $\Delta Pd_{set}$ of the control valve 32 corresponding to the discharge flow rate Qd, and computes the required Duty ratio Dt of the drive signals that is output to the coil 76 to obtain the set pressure difference $\Delta Pd_{set}$. The drive circuit 78 that received instructions from the compressor controller 77 sends the coil 76 a drive signal according to the duty ratio Dt. Accordingly, the set pressure difference $\Delta Pd_{set}$ is changed to an appropriate value so that the compressor CP is operated at the set torque $Tr_{set}$.

The position of the operating rod 53 (valve body 56) in the control valve 32, that is, the valve opening degree is determined as follows.

If power is not supplied to the coil 76 (duty ratio Dt=0%), the action of the return spring 69 is mainly effected, and the operating rod 53 is located at the initial position as shown in FIG. 3(*a*). At this time, the valve body 56 of the operating rod 53 is furthest from the valve seat 64 so that the opening degree of the control valve 32 is maximized.

When the power is supplied to the coil 76, the valve body 56 is positioned with respect to the valve seat 64 so that the upward urging force (F+f2) and the downward urging force fl are balanced, and the opening degree of the control valve 32 is determined. The amount of refrigerant gas conducted to the crank chamber 15 through the supply passage 31 is determined in accordance with the valve opening degree. The crank pressure Pc is adjusted by the relationship between the refrigerant gas amount introduced to the crank chamber 15 through the supply passage 31 and the refrigerant gas amount conducted from the crank chamber 15 through the bleed passage 30. The difference between the crank pressure Pc and the internal pressure of the compressor 22 is changed according to the change in the crank pressure Pc, and the inclination angle of the swash plate 18 is changed accordingly. When the inclination angle of the swash plate 18 is changed, the stroke of the piston 21, that is, the discharge displacement of the compressor CP, is adjusted.

For example, if the opening degree of the control valve 32 is small, the crank pressure Pc decreases and the inclination angle of the swash plate 18 increases. Consequently, the stroke of the piston 21 increases, and the compressor CP is operated at a large discharge displacement. On the contrary, if the opening degree of the control valve 32 is large, the pressure Pc in the crank chamber 15 increases and the inclination angle of the swash plate 18 decreases. Consequently, the stroke of the piston 21 decreases, and the compressor CP is operated at a small discharge displacement.

The engine controller 90 calculates the target engine output torque $Tr_{eng}$ by the use of information such as the depression degree of an acceleration pedal from the pedal position sensor 93, the rotational speed Ne of the engine 25 from the rotational speed sensor 92, and the set torque $Tr_{set}$ received from the air conditioner controller 80 and the like. The engine controller 90 controls the engine 25 to obtain the target engine output torque $Tr_{eng}$.

Specifically, the engine controller 90 determines the target opening degree or size of the throttle valve based on the target engine output torque $Tr_{eng}$ and executes a command to produce the target opening degree to a throttle device 96. The throttle device 96 adjusts the opening degree of a throttle valve (not shown) and thus adjusts the intake air amount.

The engine controller 90 calculates a target fuel injection amount based on the suction air pressure, from the air pressure sensor 94, and the previously stored theoretical air-fuel ratio and instructs the fuel injection device 97 to produce the target fuel injection amount. The fuel injection device 97 injects the target amount of fuel corresponding to the instructed theoretical air-fuel ratio into the fuel chamber of the engine 25 in the suction stroke.

The engine controller 90 determines a target value of the target rotational speed $Ne_{set}$ of the engine 25 based on the target engine output torque $Tr_{eng}$. Further, the engine controller 90 calculates a target transmission ratio based on the target rotational speed Neset and the vehicle speed from a vehicle speed sensor 91 and instructs the continuously variable transmission 95 to produce the target transmission ratio. The continuously variable transmission 95 adjusts the rotational speed Ne of the engine 25 to the target rotational speed $Ne_{set}$ by adjusting the pulley ratio (effective diameter ratio) of for example the drive pulley to the driven pulley to attain the instructed target transmission ratio. As a result, the engine 25 is operated by the combination of the engine output torque Treng and the rotational speed $Ne_{set}$ from which the optimal fuel efficiency can be obtained.

The first embodiment has the following advantages.

The air conditioner controller 80 sends torque setting signals for the set torque $Tr_{set}$ to the compressor controller 77 so that the torque Tr of the compressor CP produces the set torque $Tr_{set}$. Therefore, the air conditioner controller 80 is able to execute accurate control of the compressor displacement based on torque.

The air conditioner controller 80 also sends the torque signals for the set torque $Tr_{set}$ to the engine controller 90. Accordingly, when the engine 25 is efficiently controlled based on the value of the load torque Tr of the compressor CP, the engine controller 90 is able to use the set torque $Tr_{set}$ from the air conditioner controller 80 as data concerning the compressor torque and a load torque estimation map is not needed. This simplifies the control of the engine 25. Further, the vehicle air conditioner can be easily applied to various vehicles.

The controllers 77, 80 and 90 communicate torque information with one another. Therefore, time and effort to convert other signals to torque signals are omitted between the controllers 77, 80 and 90, and the control of the compressor CP displacement and output of the engine 25 become easier.

The air conditioner controller 80 functions as an external controller that instructs the compressor controller 77 to produce the set torque $Tr_{set}$. Thus, a special external controller other than the air conditioner controller 80 is not needed, which conserves space.

The compressor controller 77 computes the set pressure difference $\Delta Pd_{set}$ of the control valve 32, which corresponds to the set torque $Tr_{set}$, from equations 6 and 7 and then controls the control valve 32 so that the pressure difference $\Delta Pd$ of the control valve 32 is steered to the set pressure difference $\Delta Pd_{set}$. Since, in the compressor controller 77, the load torque Tr can be accurately estimated in spite of the constitution of the external refrigerant circuit 1 of the vehicle air conditioner, the vehicle air conditioner can be easily applied to various vehicles.

In equation 6, the suction pressure Ps of the compressor CP is used as a variable. Therefore, the computation of the set pressure difference $\Delta Pd_{set}$ of the control valve 32 is highly accurate, and the compressor load torque Tr is controlled with high accuracy.

The suction pressure Ps and discharge pressure Pd of the compressor CP and the rotational speed Nc of the drive shaft 16 are respectively detected by the sensors 41, 42 and 43 provided in the compressor module CPM. Accordingly, all information necessary for controlling the displacement of the compressor CP is collected by an information detector in the compressor module CPM. As a result, it is not necessary to provide an additional information detector outside the compressor module CPM. Accordingly, in the air conditioner, it is possible to combine a different compressor module CPM of another maker with the refrigerant circuit.

The control valve 32 includes the operating rod 53, which mechanically detects the pressure differences $\Delta Pd$ across the fixed restrictor 8a. The valve opening degree of the control valve 32 is automatically adjusted based on the pressure difference $\Delta Pd$ detected by the operating rod 53, and the set pressure difference $\Delta Pd_{set}$, which is an index for controlling the automatic valve opening degree, is controlled by the amount of current supplied to the coil 76. Therefore, the adjustment of the opening degree of the control valve 32 is rapidly carried out.

(Second Embodiment)

Figure 5A:
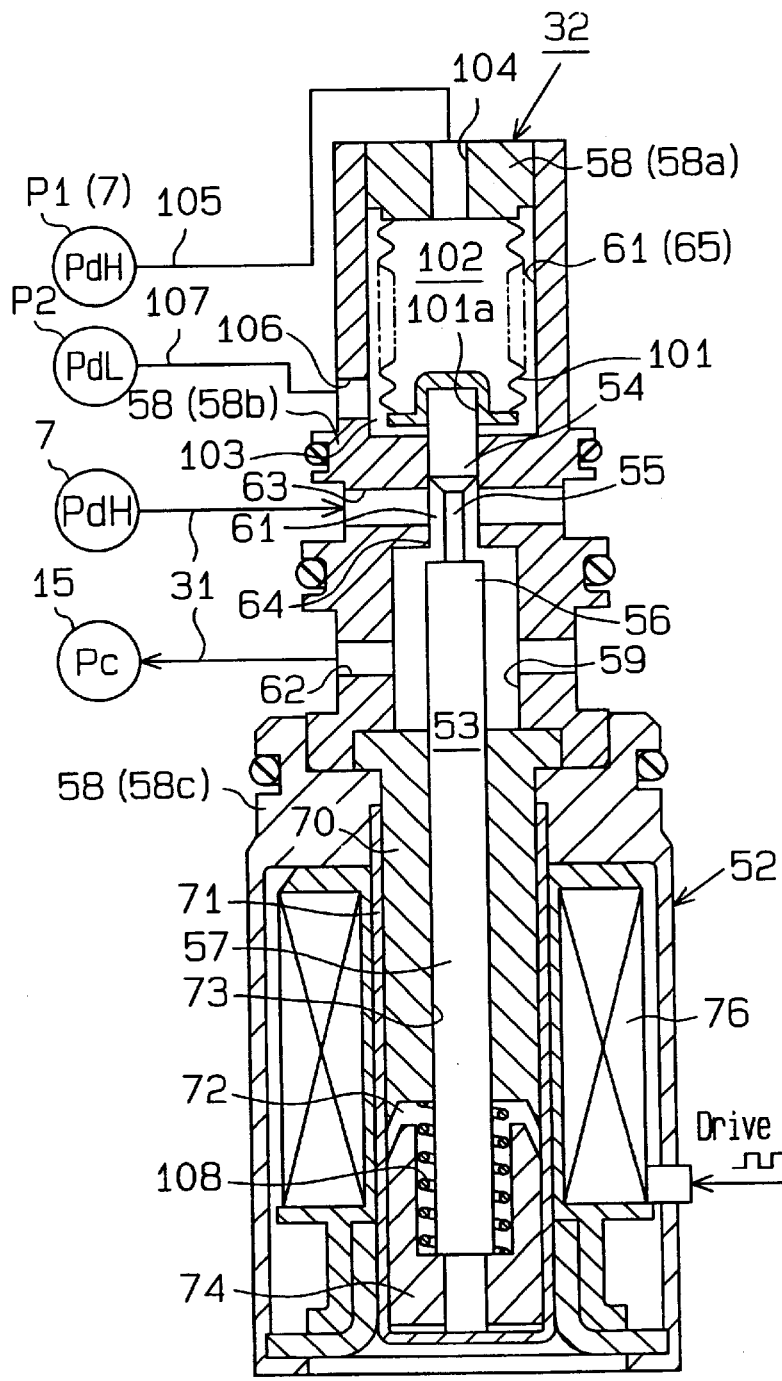
FIG. 5(a) is a cross-sectional view of a control valve of the second embodiment.
Figure 5B:
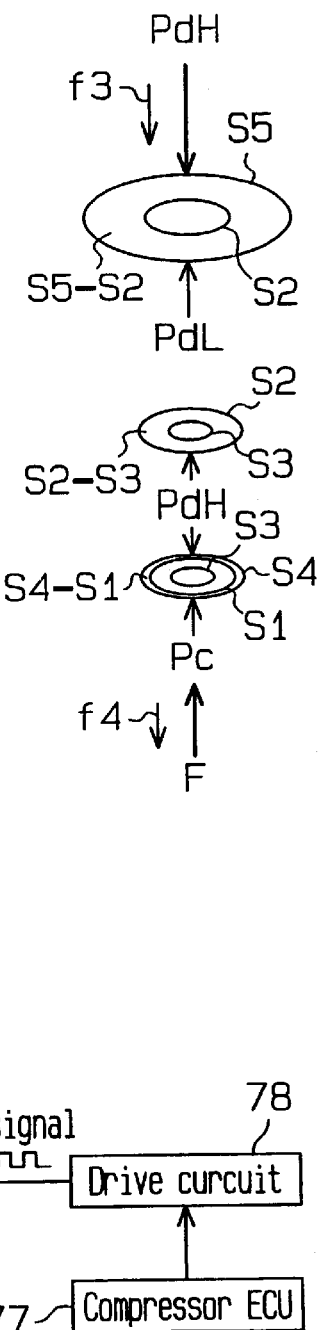
FIG. 5(b) is a schematic view for explaining forces which act on an operating rod.

As shown in FIG. 5, a cylindrical bellows with a bottom 101, which functions as a pressure sensing member, is contained in the high pressure chamber 65. In this embodiment, the operating rod 53 and the bellows 101 function as first and second pressure difference detectors, respectively. The top end of the bellows 101 is fixed to a plug 58a. The bellows 101 divides the high pressure chamber 65 into a first pressure chamber 102, which is located inside the bellows 101, and a second pressure chamber 103, which is located outside the bellows 101.

The bottom wall of the bellows 101 is provided with a hole 101a for receiving the operating rod 53, and the upper end of the divider 54 of the operating rod 53 is inserted into the hole 101a. The bellows 101 is mounted in the high pressure chamber 65 in an elastically compressed manner. The bellows is pressed against the divider 54 by a downward force f3 due to this compression through the hole 101a.

The first pressure chamber 102 is connected to the discharge chamber 7, in which the first pressure monitoring point P1 is located, through a P1 port 104 formed in the plug 58a and a first pressure detecting passage 105. The second pressure chamber 103 is connected to the second pressure monitoring point P2 through a radial P2 port 106 and a second pressure detecting passage 107 formed in the upper housing member 58b of the valve housing 58. The monitored pressure PdH at the first pressure monitoring point P1 is applied to the first pressure chamber 102 and the monitored pressure PdL at the second pressure monitoring point P2 is applied to the second pressure chamber 103.

A supply passage 31 connects the first pressure monitoring point P1 to the crank chamber 15. An upstream portion of the supply passage 31 connects the first pressure monitoring point P1 to the control valve 32 through the second port 63 and a downstream portion connects the control valve 32 to the crank chamber 15 through the first port 62. That is, in the second embodiment, the direction of refrigerant gas flow through the first and second ports is different from that of the first embodiment.

Between the fixed iron core 70 and the movable iron core 74 in the plunger chamber 72, a coil-shaped spring 108 is accommodated. The force of the spring 108 separates the movable iron core 74 from the fixed iron core 70, that is, the spring 108 spaces the valve body from the valve seat 64.

Various forces acting on the divider 54 will be described. The divider 54 receives a downward force f3 from the bellows 101. The divider 54 also receives a downward force based on the difference between the downward force of the pressure PdH in the first pressure chamber 102 and the upward force of the pressure PdL in the second pressure chamber 103. The effective receiving pressure area of the bellows 101 with respect to the pressure PdH in the first pressure chamber 102 is equal to the cross-sectional area S5 of the bellows. The effective receiving pressure area of the bellows 101 with respect to the pressure PdL in the second pressure chamber 103 is the cross-sectional area S5 minus the cross-sectional area S2 of the divider 54. Thus, the divider 54 receives a force of PdH×S5−PdL(S5−S2). When the downward force is a positive value, the net force $\Sigma$F1 of the downward forces acting on the divider 54 is expressed by equation 8, which follows $\Sigma F1 = PdH \cdot S5 - PdL(S5-S2) - PdH(S2-S3) + f3 = PdH(S5-S2+S3) - PdL(S5-S2) + f3$  Equation 8

Next, various forces acting on the guide 57 will be described. The guide 57 receives a downward force f4 from the spring 108. The guide 57 also receives a downward force based on the pressure Pd in the through hole 60. The pressure PdH of the crank pressure chamber 66 acts on the guide 57. The receiving pressure area of the guide 57 with respect to the pressure PdH in the through hole 60 is the cross-sectional are S1 of the through hole 60 minus the cross-sectional area S3 of the coupler 55. The guide 57 further receives an upward force based on the pressure Pc in the valve chamber 59. The receiving pressure area of the guide 57 with respect to the pressure Pc in the valve chamber 59 is the cross-sectional area S4 of the guide 57 minus the cross-sectional area S1 of the through hole 60. When the upward force is positive, the net force $\Sigma$F2 of the upward forces acting on the guide 57 is expressed by equation 9, which follows $\Sigma F2 = F - f4 - PdH(S1-S3) - Pc(S4-S1) + Pc \cdot S4 = F - f4 - PdH(S1-S3) + Pc \cdot S1$  Equation 9

As in the first embodiment, the axial position of the operating rod 53 is defined at a position where $\Sigma$F1 in equation 8 is equal to $\Sigma F2$ in equation 9. Provided that $\Sigma F1=\Sigma F2$, equation 10, which follows, can be obtained.

$$PdH(S5-S2+S1)-PdL(S5-S2)-Pc\cdot S1=F-f3-f4 \qquad \text{Equation 10}$$

The cross-sectional area S1 of the through hole 60 is equal to the cross-sectional area S2 of the divider 54. Thus, if S2 in equation 10 is replaced with S1, which follows, equation 11 is obtained.

$$(PdH-PdL)S5+(PdL-Pc)S1=F-f3-f4 \qquad \text{Equation 11}$$

As apparent from equation 11, the control valve 32 of the second embodiment positions the operating rod 53 by a composite effect of a force based on the first pressure difference $\Delta Pd1$ (PdH–PdL) and a force based on the second pressure difference $\Delta Pd2$ (PdL–Pc). That is, the operating rod 53 is displaced by not only the variation of the first pressure difference $\Delta Pd1$ but also by the second pressure difference $\Delta Pd2$. As described above, the control valve 32 of the second embodiment positions the operating rod 53 to maintain a constant relationship between the first pressure difference $\Delta Pd1$ and the second pressure difference $\Delta Pd2$ as determined by the electromagnetic force F.

It is noted that in the second pressure difference $\Delta Pd2$, the discharge pressure PdL is significantly larger than the crank pressure Pc. Therefore, the second pressure difference $\Delta Pd2$ may be approximated to the discharge pressure PdL. In other words, the operating rod 53 may be positioned by the discharge pressure PdL using the crank pressure Pc on the low pressure side.

The second embodiment has the following advantages in addition to those of the above-described first embodiment.

The first pressure difference $\Delta Pd1$, which is the pressure difference across the fixed restrictor 8a, substantially reflects the discharge gas flow rate Qd except when the discharge gas flow rate Qd is small. When the discharge gas flow rate Qd is small, the force of first pressure difference $\Delta Pd1$ is too small to position the operating rod 53. The control valve 32 in the second embodiment employs, in addition to the first pressure difference $\Delta Pd1$, the second pressure difference $\Delta P2$. Thus, the operating rod 53 is influenced by the second pressure difference $\Delta Pd2$, and the operating rod 53 is accurately positioned. This improves the adjustment of the valve opening degree.

It should be apparent to those skilled in the art that the present invention may be embodied in many other specific forms without departing from the spirit or scope of the invention. Particularly, it should be understood that the invention may be embodied in the following forms.

Instead of the separate controllers 77, 80 and 90, one or two controllers, which perform the tasks of these controllers 77, 80 and 90, may be provided.

For example, instead of the compressor controller 77 provided in the compressor module CPM, the air conditioner controller 80 or the engine controller 90 may perform the functions of the compressor controller 77. In this case, the torque setting signals are set in the air conditioner controller 80 or the engine controller 90, and torque setting signals are associated with the index for controlling the control valve. In this case, the CPU memory of the air conditioner controller 80 or the engine controller 90 is increased as required. With such a structure, CPU is localized in the air conditioner controller 80 or the engine controller 90 thereby simplifying the structure of the air conditioner.

Furthermore, the engine controller 90 may perform the function of the air conditioner controller 80 that controls an engine. Thus, a separate air conditioner controller 80 need not be provided. Additionally, the engine controller 90 may function as an external controller. When the engine controller 90 functions as the external controller, it sends torque setting signals to the compressor controller 77 to control the control valve 32 so that the set torque $Tr_{set}$ is attained. This simplifies a network structure that transmits the control signals between controllers.

The air conditioner controller 80 stores the last set torque $Tr_{set}$ instead of computing the values of the set torque $Tr_{set}$ sent to the compressor controller 77 from the first every time, and may increase or decrease the value by a predetermined value to be the next set torque $Tr_{set}$. That is, when the discharge displacement of the compressor CP is small, a predetermined value is added to the last set torque $Tr_{set}$, and when the discharge displacement of the compressor CP is large, a predetermined value is subtracted from the last set torque $Tr_{set}$. This simplifies the computation of the set torque $Tr_{set}$.

The external controller may be a simple manual adjuster. In this case, the external controller sets the set $Tr_{set}$ in a simple way instead of computing the set torque $Tr_{set}$ by CPU from conditions relating to the temperature from the temperature adjuster 82 and the passenger compartment temperature sensor 83. For example, the set torque $Tr_{set}$ is altered stepwise or continuously and sent to the compressor controller 77 by operation of an adjustment knob that sets the cooling conditions in a manual air conditioner. In an exceptional control mode, a predetermined minimum set torque $Tr_{set}$ is output to the compressor controller 77 by the instruction from the engine controller 90. Signals indicating the set torque $Tr_{set}$ can also be output to the engine controller 90 for computing the target engine output torque $Tr_{eng}$. As a result, when the external controller is the air conditioner controller 80, the engine controller 90 effectively controls the engine 25 based on the operating conditions of the compressor CP without mounting a CPU on the air conditioner controller 80.

The rotational speed Nc of the drive shaft 16 may be computed in the rotational speed sensor 92 instead of detecting the rotation sensor 43 in the compressor module CPM. As a result, the rotation sensor is not needed and the constitution of the compressor module becomes simple and the cost is reduced.

The engine controller 90 receives the torque signals regarding the set torque $Tr_{set}$ from the air conditioner controller 80. After that, the engine controller 90 judges whether the vehicle is in a normal mode or in an exceptional mode. Then, as described with reference to FIG. 4, when the vehicle is in an exceptional mode, the set torque $Tr_{set}$ is changed to give priority to the vehicle travel, and the torque setting signals regarding the changed set torque $Tr_{set}$ may be sent to the compressor controller 77. Even if the vehicle is in an exceptional mode, the engine controller 90 need not necessarily be operated at the minimum displacement of the compressor CP, and the maximum torque in the allowable range that can be applied to the compressor CP may be the set torque $Tr_{set}$ of the compressor CP. As a result, the control time can be shortened and the air conditioner can be efficiently operated.

The compressor controller 77 may output signals concerning the load torque value Tr to the engine controller 90. In this case, the receipt of the torque setting signal regarding the set torque $Tr_{set}$ by the compressor controller 77 and control of the control valve 32 is delayed. However, the engine controller 90 is able to compute the target engine output torque $Tr_{eng}$ by using the actual load torque Tr, which is more accurate than the set torque $Tr_{set}$. Accordingly, the engine 25 can be further efficiently controlled.

An external controller other than the air conditioner controller 80 and the engine controller 90 may be provided. The external controller judges whether any one of the operation torque values, which both the air conditioner controller 80 and the engine controller 90 respectively require of the compressor module CPM, is preceded, and sents the compressor controller 77 the set torque $Tr_{set}$.

The compressor controller 77 is located at the suction pressure zone or near the suction pressure zone of the compressor CP. As a result, the compressor controller 77 is cooled by the suction refrigerant, the temperature of which is comparatively low.

In the compressor controller 77, when the suction pressure Ps from the suction pressure sensor 41 falls below a predetermined value, the load torque Tr of the compressor CP may be reduced regardless of the set torque Trset instructed from the air conditioner controller 80.

In the control valve 32 in the second embodiment, the pressure of the second pressure difference ΔP2 may be the suction pressure Ps, which is lower than the crank pressure Pc, in place of the crank pressure Pc. In this case, the effect of the discharge pressure PdL becomes more predominant and the adjustment of the valve opening degree in a case where the discharge gas flow rate Qd is low, is further improved.

In the second embodiment, the discharge pressure sensor 42 of the compressor module CPM, which detects the discharge pressure Pd, may be removed to fix the value of the discharge pressure Pd in equation 6. This simplifies the computing by the compressor controller 77 thereby reducing the cost of the compressor module CPM. The reason why the discharge pressure Pd need not be used as a variable in equation 6 is that, in the second embodiment, the input current value I into the coil 76 is expressed by a fixed relationship between the first pressure difference ΔPd1, which is reflected by the discharge gas flow rate Qd, and the second pressure difference ΔPd2, which is controlled by the discharge pressure PdL. In this case, the discharge gas flow rate Qd and the discharge pressure PdL are indirect variables in equation 6 (for example, $Tr=L/(2\pi \cdot Nc)$ and $L=a \times I+b$; a and b each are constant).

The control valve 32 may be a so-called discharge side control valve that controls the opening degree of the bleed passage 30 instead of adjusting the opening degree of the supply passage 31.

Therefore, the present examples and embodiments are to be considered as illustrative and not restrictive and the invention is not to be limited to the details given herein, but may be modified within the scope and equivalence of the appended claims.

What is claimed is:

1. A displacement control apparatus for controlling the discharge displacement of a variable displacement compressor, wherein the compressor is incorporated in a refrigerant circuit of a vehicle air conditioner and includes a drive shaft, wherein a load torque is imposed on the drive shaft by driving the drive shaft with an external drive source, and a change in the load torque reflects the control of the discharge displacement, the displacement control apparatus comprising:

a control valve for changing the displacement of the compressor by changing the valve opening degree;

a first controller, which is provided outside the compressor, for sending a torque setting signal, which indicates a set torque for controlling the discharge displacement of the compressor; and a second controller for receiving the torque setting signal sent from the first controller, wherein the controller computes an index for changing the opening degree of the control valve based on the torque setting signal so that the load torque of the compressor is changed to the set torque, wherein the index indicates the pressure difference between the pressures at two pressure monitoring points in the refrigerant circuit, wherein the opening degree is changed by changing the pressure difference to a target pressure difference which corresponds to the set torque, and as a result, the control valve opening degree is controlled to change the displacement of the compressor.

2. The displacement control apparatus according to claim 1, wherein the second controller is a compressor controller mounted on the compressor.

3. The displacement control apparatus according to claim 1 further comprising an air conditioner controller for controlling the air conditioner, and a detection device, which is connected to the air conditioner controller, for detecting information concerning the refrigerant performance required of the refrigerant circuit of the air conditioner, wherein the air conditioner controller determines the set torque based on the information.

4. The displacement control apparatus according to claim 2 further comprising an air conditioner controller for controlling the air conditioner, and a detection device, which is connected to the air conditioner controller, for detecting information concerning the refrigerant performance required of the refrigerant circuit of the air conditioner, wherein the air conditioner controller determines the set torque based on the information.

5. The displacement control apparatus according to claim 2, wherein the external drive source is an engine, wherein the apparatus further comprises an engine controller for controlling the engine, wherein the first controller also sends the torque setting signal to the engine controller.

6. The displacement control apparatus according to claim 3, wherein the external drive source is an engine, wherein the apparatus further comprises an engine controller for controlling the engine, wherein the first controller also sends the torque setting signal to the engine controller.

7. The displacement control apparatus according to claim 6, wherein the first controller is the air conditioner controller or the engine controller.

8. The displacement control apparatus according to claim 2, wherein the external drive source is an engine, wherein the apparatus further comprises:

an air conditioner controller for controlling the air conditioner;

a first detecting device, which is connected to the air conditioner controller, for detecting the information concerning the refrigerant performance required of the refrigerant circuit of the air conditioner, wherein a first set torque is calculated by the air conditioner controller based on the information detected by the first detecting device;

an engine controller for controlling the engine; and a second detecting device, which is connected to the engine controller, for detecting the information concerning a load imposed on the engine, wherein a second set torque is determined by the engine controller based on the information detected by the second detecting device, wherein the first controller determines the torque setting signal based on one of the first set torque and second set torque.

9. A displacement control method for controlling the discharge displacement of a variable displacement compressor, wherein the compressor is incorporated in a refrigerant circuit of a vehicle air conditioner and includes a drive shaft, wherein a load torque is imposed on the drive shaft by driving the drive shaft with an external drive source, and a change in the load torque reflects the control of the discharge displacement, the method comprising:

determining a set torque for controlling the displacement of the compressor outside the compressor;

transmitting a torque setting signal indicating the set torque to the compressor; and changing the load torque to the set torque by controlling the discharge displacement of the compressor based on the torque setting signal, wherein the step of changing the load torque to the set torque comprises:

detecting a pressure difference between the pressures at two pressure monitoring points in the refrigerant circuit, wherein the pressure difference reflects the load torque; and changing the pressure difference between the two pressure monitoring points to a target pressure difference, wherein the target pressure difference corresponds to the set torque.

10. The method according to claim 9, wherein the set torque is determined based on information concerning the cooling performance required of the air conditioner or information reflecting the load imposed on the external drive source.

11. The method according to claim 9 further comprising computing the load imposed on the external drive source by the compressor using the set torque.

12. The method according to claim 10 further comprising computing the load imposed on the external drive source by the compressor using the set torque.

13. A displacement control method for controlling the discharge displacement of a variable displacement compressor, wherein the compressor is incorporated in a refrigerant circuit of a vehicle air conditioner and includes a drive shaft, wherein a load torque is imposed on the drive shaft by driving the drive shaft with an external drive source, and a change in the load torque reflects the control of the discharge displacement, the method comprising:

determining a set torque for controlling the displacement of the compressor outside the compressor;

transmitting a torque setting signal indicating the set torque to the compressor; and changing the load torque to the set torque by controlling the discharge displacement of the compressor based on the torque setting signal, wherein the step of changing the load torque to the set torque comprises:

detecting a first pressure difference between the pressures at two pressure monitoring points in the refrigerant circuit;

detecting a second pressure difference, which is different from the first pressure difference, between the two pressure monitoring points, wherein the first and second pressure differences reflect the load torque; and changing the first and second pressure differences to target pressure differences, wherein the target pressure differences correspond to the set torque.

14. A compressor module comprising:

a compressor, which forms part of a refrigerant circuit in a vehicle air conditioner, wherein the compressor includes a drive shaft on which a load torque is imposed by an external drive source;

a control valve located in the compressor for changing the discharge displacement of the compressor by controlling the valve opening degree; and a compressor controller mounted on the compressor, wherein the compressor controller receives a torque setting signal indicating a set torque from outside the compressor, wherein the compressor controller computes an index for changing the control valve opening degree based on the torque setting signal so that the load torque is changed to the set torque, wherein the index indicates the pressure difference between the pressures at two pressure monitoring points in the refrigerant circuit, wherein the opening degree is changed by changing the pressure difference to a target pressure difference which corresponds to the set torque, wherein the compressor controller sends an instruction to the control valve according to the index, and as a result, the control valve opening degree is controlled to control the displacement of the compressor.

15. The compressor module according to claim 14 further comprising:

a crank chamber through which the drive shaft passes;

a cam plate that inclines with respect to the drive shaft and rotates integrally with the drive shaft in the crank chamber; and a piston, which is cooperatively coupled with the cam plate, wherein the piston reciprocates in a compressing chamber, wherein the stroke of the piston reflects a compressor displacement and is changed by a change in the inclination of the cam plate in accordance with the pressure of the crank chamber, wherein the control valve controls the pressure in the crank chamber by adjusting the valve opening degree and the compressor controller uses an equation representing the relationship between a plurality of variables and a set torque to compute an index of the valve opening degree for a set torque, and the variables include the discharge pressure of the compressor, the rotational speed of the drive shaft and the discharge gas flow rate.

16. The compressor module according to claim 15 further comprising an information detector for determining values of the variables.

17. The compressor module according to claim 15, wherein the variables include the suction pressure.

18. The compressor module according to claim 15, wherein the refrigerant circuit has a condenser connected to the compressor through a high pressure pipe, and the compressor discharges refrigerant gas through the compressing chamber in accordance with the stroke of the piston, and the compressor has a discharge chamber connected to the high pressure pipe, the high pressure pipe being located between the discharge chamber and the condenser, wherein a restrictor is located in the high pressure pipe, and the control valve includes a pressure difference detector for mechanically detecting the pressure difference between the pressures across the restrictor, the valve opening degree being adjusted based on the pressure difference detected by the pressure difference detector.

19. A compressor module comprising:

a compressor, which forms part of a refrigerant circuit in a vehicle air conditioner, wherein the compressor includes a drive shaft on which a load torque is imposed by an external drive source;

a control valve located in the compressor for changing the discharge displacement of the compressor by controlling the valve opening degree, wherein the control valve includes a first pressure difference detector and a second pressure difference detector for mechanically detecting a first pressure difference and a second pressure difference which is different from the first pressure difference, respectively, wherein the first and second pressure differences are the pressure differences between the pressures at two pressure monitoring points in the refrigerant circuit, wherein the second pressure difference is based on the discharge pressure of the compressor; and a compressor controller mounted on the compressor, wherein the compressor controller receives a torque setting signal indicating a set torque from outside the compressor, wherein the compressor controller computes an index for changing the control valve opening degree based on the torque setting signal so that the load torque is changed to the set torque, wherein the opening degree is adjusted based on the index by a fixed relationship between the first pressure difference and the second pressure difference, wherein the compressor controller sends an instruction to the control valve according to the index, and as a result, the control valve opening degree is controlled to control the displacement of the compressor.

* * * * *